United States Patent [19]

Chen et al.

[11] Patent Number: 5,243,317
[45] Date of Patent: Sep. 7, 1993

[54] MAGNETO-RESISTOR DIGITIZER

[75] Inventors: Hsing Chen; Pie-Yu Jeang; Spring Yeh, all of Hsinchu; Ting Chou, Taipei; Ping-Wei Wang, Hsinchu, all of Taiwan

[73] Assignee: Industrial Technology Research Institute, Taiwan

[21] Appl. No.: 804,738

[22] Filed: Dec. 11, 1991

[51] Int. Cl.$^5$ ............................................. H01C 10/06
[52] U.S. Cl. ................................... 338/92; 338/114
[58] Field of Search ........................ 338/92, 99, 114; 178/19

[56] References Cited

U.S. PATENT DOCUMENTS

| | | | |
|---|---|---|---|
| 4,482,784 | 11/1984 | Whetstone | 178/19 |
| 4,739,299 | 4/1988 | Eventoff et al. | 338/99 |
| 4,810,992 | 3/1989 | Eventoff | 338/99 |
| 4,833,279 | 5/1989 | Chen et al. | 178/18 |

FOREIGN PATENT DOCUMENTS

| | | |
|---|---|---|
| 58-35414 | 3/1983 | Japan . |
| 174126 | 11/1985 | Japan . |
| 174950 | 11/1985 | Japan . |
| 187947 | 12/1985 | Japan . |
| 187949 | 12/1985 | Japan . |
| 187950 | 12/1985 | Japan . |
| 187956 | 12/1985 | Japan . |

*Primary Examiner*—Marvin M. Lateef
*Attorney, Agent, or Firm*—Sughrue, Mion, Zinn, Macpeak & Seas

[57] ABSTRACT

A digitizer whose sensing elements are made of magnetoresistive materials is designed for use with a computer system. The digitizer board includes a substrate made of dielectric material; a first array of strip-shaped magneto-resistors arranged on the front surface of the substrate; a second array of strip-shaped magneto-resistors arranged on the reverse surface of the substrate; a plurality of analog comparators coupled to the magneto-resistors; and a pen with a magnetic pinpoint used for pointing to a particular location on the front side of the digitizer board. The resistance of the magneto-resistors will vary due to a magnetic field emerging from the nearby pinpoint, and the magnetic-resistors will be effected, and subsequently the comparators connected to the magneto-resistors will send digital signals to the computer system.

6 Claims, 8 Drawing Sheets

5,243,317

MAGNETO-RESISTOR DIGITIZER

BACKGROUND OF THE INVENTION

The present invention relates to a digitizer board, and more particularly, to a digitizer board which is made of magneto-resistors (MR).

A digitizer is a graphics input peripheral device for a computer system. The digitizer generally comprises a plurality of sensing members arranged in an array on a board. The sensing members are capable of sensing a physical quantity and sending a digital signal indicating the position where the physical quantity is sensed to the computer system.

A number of elements have been utilized as the sensing member for prior art digitizers. These elements include magnetoresistive, electromagnetic inductive, electrostatic, piezoelectric, and photoelectric element, etc.

A magneto-resistor is an element whose resistance is changed when a magnetic field is applied thereto. Referring to FIG. 1, there is shown a characteristic curve of resistance against magnetic flux density for a magneto-resistor. As can be seen, the curve is substantially linear when the applied magnetic flux is larger than about 2600 Gauss. The larger the magnetic flux density acting on the magneto-resistor, the larger the resistance of the magneto-resistor becomes. Therefore, the magneto-resistor can be utilized for sensing a physical quantity of magnetic flux densities.

Conventional applications of magneto-resistors include the use of it as a rotational speed detector or as a displacement detector etc.

SUMMARY OF THE INVENTION

It is a primary object of the present invention to provide a digitizer board whose sensing elements are made of magnetoresistive materials.

In accordance with the above object, the digitizer board of the present invention comprises a substrate made of dielectric material, an array of first magnetic resistors arranged on the front surface of the substrate, an array of second magneto-resistors arranged on the reverse surface of the substrate.

Each of the first and the second magneto-resistor is made substantially into the shape of a strip. The first magneto-resistors are oriented in a direction normal to the direction in which the second magneto-resistor are oriented.

A pen with a magnetic tip is used for pointing to a particular location on the front side of the digitizer board. To better attract the magnetic flux from the pen, the digitizer board further comprises a plate made of a material with good magnetic permeability disposed on the reverse surface of the substrate.

BRIEF DESCRIPTION OF THE DRAWINGS

The present invention can be more fully understood by reading the subsequent detailed description of the preferred embodiments with references made to the accompanying drawings, wherein:

FIGS. 2A-2C shows the operation of an analog comparator coupled with a magneto-resistor; wherein FIG. 2A shows the circuit diagram, FIG. 2B shows a diagram of the signal which appears at the non-inverting input of the analog comparator, and FIG. 2C shows a diagram of the output signal of the analog comparator;

FIGS. 6A-6B show an experiment conducted for the digitizer board according to the present invention, wherein FIG. 6A shows how the experiment is conducted, and FIG. 6B shows a plurality of signal diagrams related to the result of the experiment.

DETAILED DESCRIPTION OF THE PREFERRED EMBODIMENTS

Figure 1:
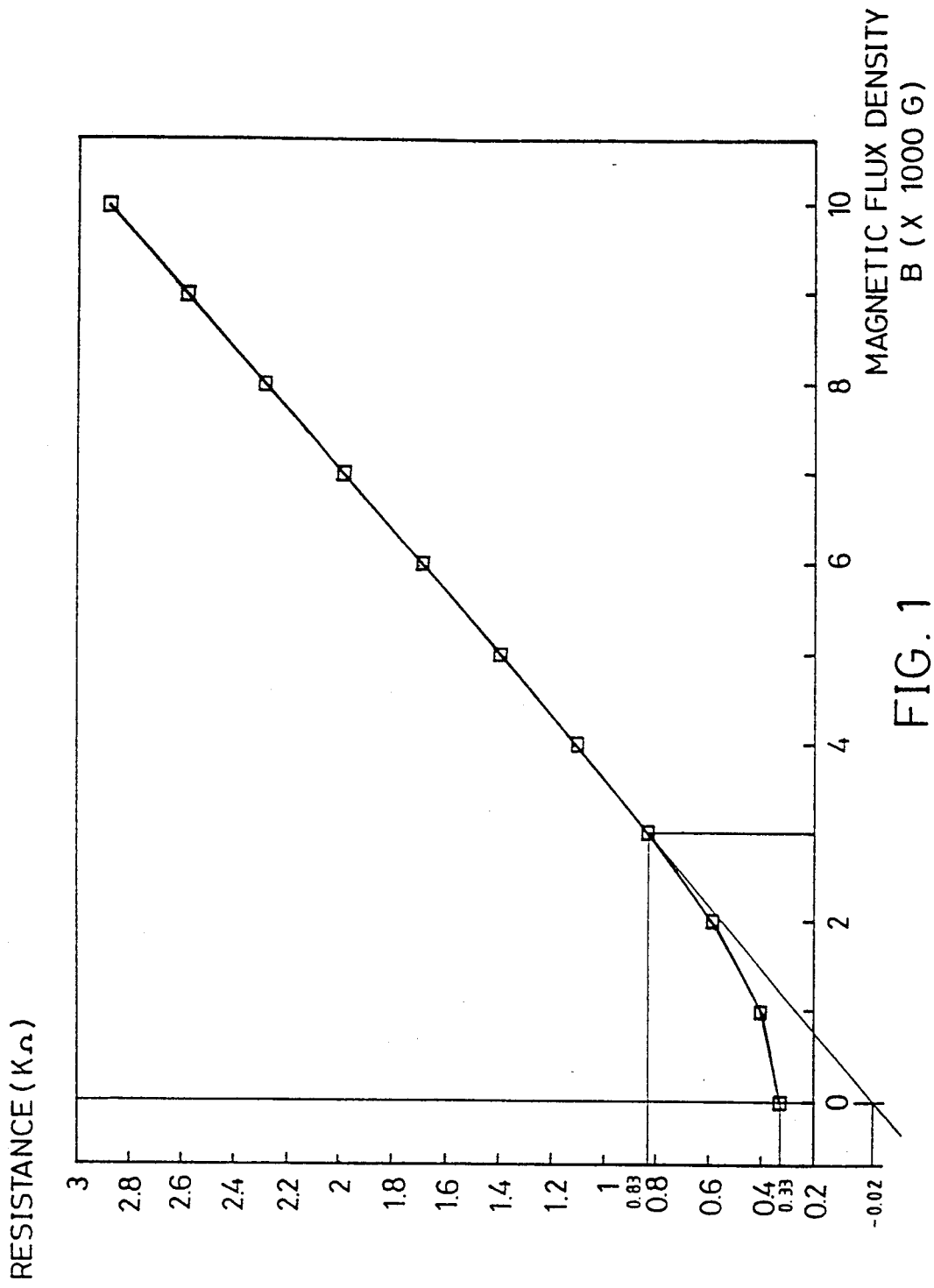
FIG. 1 is a graph, showing the resistance versus magnetic flux density characteristic curve of a magneto-resistor utilized in the present invention.
Figure 2A:
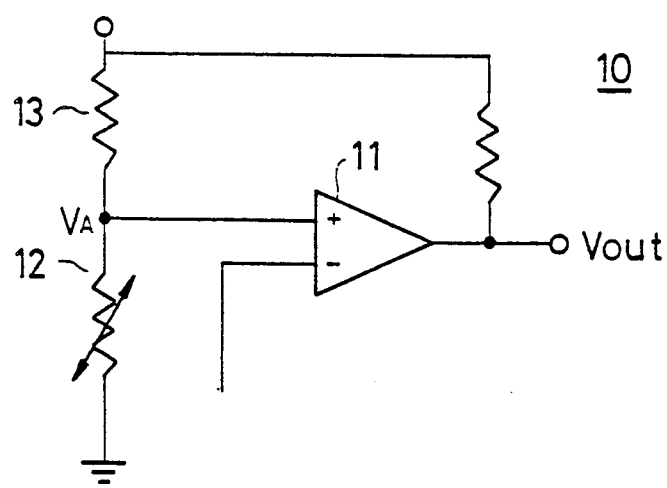

Referring to FIG. 2, there is shown a circuit diagram of an analog comparator 10 which consists essentially of an operational amplifier 11 coupled with a magneto-resistor 12. The magneto-resistor 12 has one end thereof connected to the ground and the other end thereof connected to a resistor 13 of 10 KΩ and to the non-inverting input of the operational amplifier 11. A constant reference voltage is applied to inverting input of the operational amplifier 11 and which is present to 2.5 V.

When there is no magnetic field acting on the magneto-resistor 12, the resistance of the magneto-resistor 12 is about 9.8 kΩ. The voltage input to the non-inverting input is therefore about 2.4 V which is slightly smaller than the reference voltage of 2.5 V. Under this condition, the output voltage of the analog comparator 10 is at a low level, representing an output digital signal of 0.

Figure 2B:
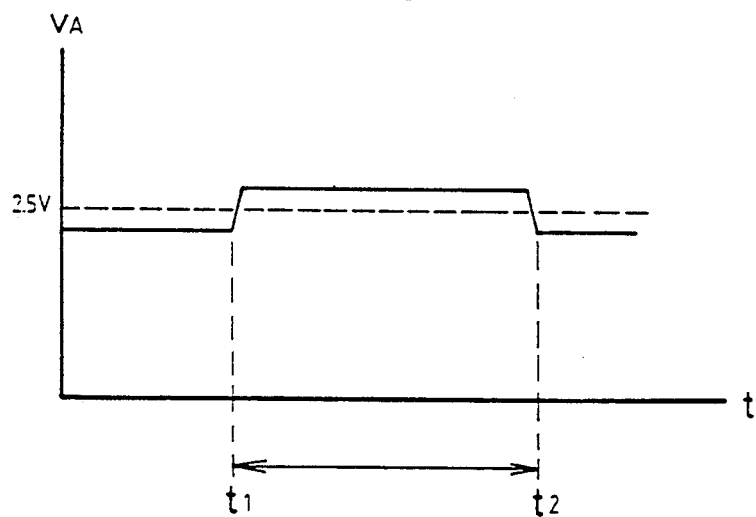
Figure 2C:
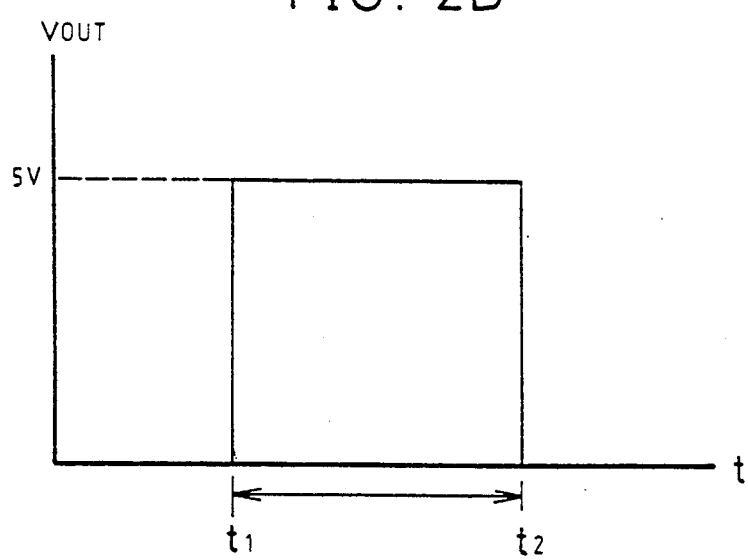

As a magnetic field is applied to the magneto-resistor 12, the resistance of the magnetic resistor 12 is increased. If the magnetic field is strong enough to cause the resistance of the magneto-resistor 12 to be larger than 10 KΩ, the voltage $V_A$ appearing at the non-inverting input of the operational amplifier 11 will become greater than the reference voltage of 2.5 V as shown in FIG. 2B, causing the output voltage of the analog comparator 10 to change from the low level to a high level as shown in FIG. 2C, representing an output digital signal of 1.

Figure 3:
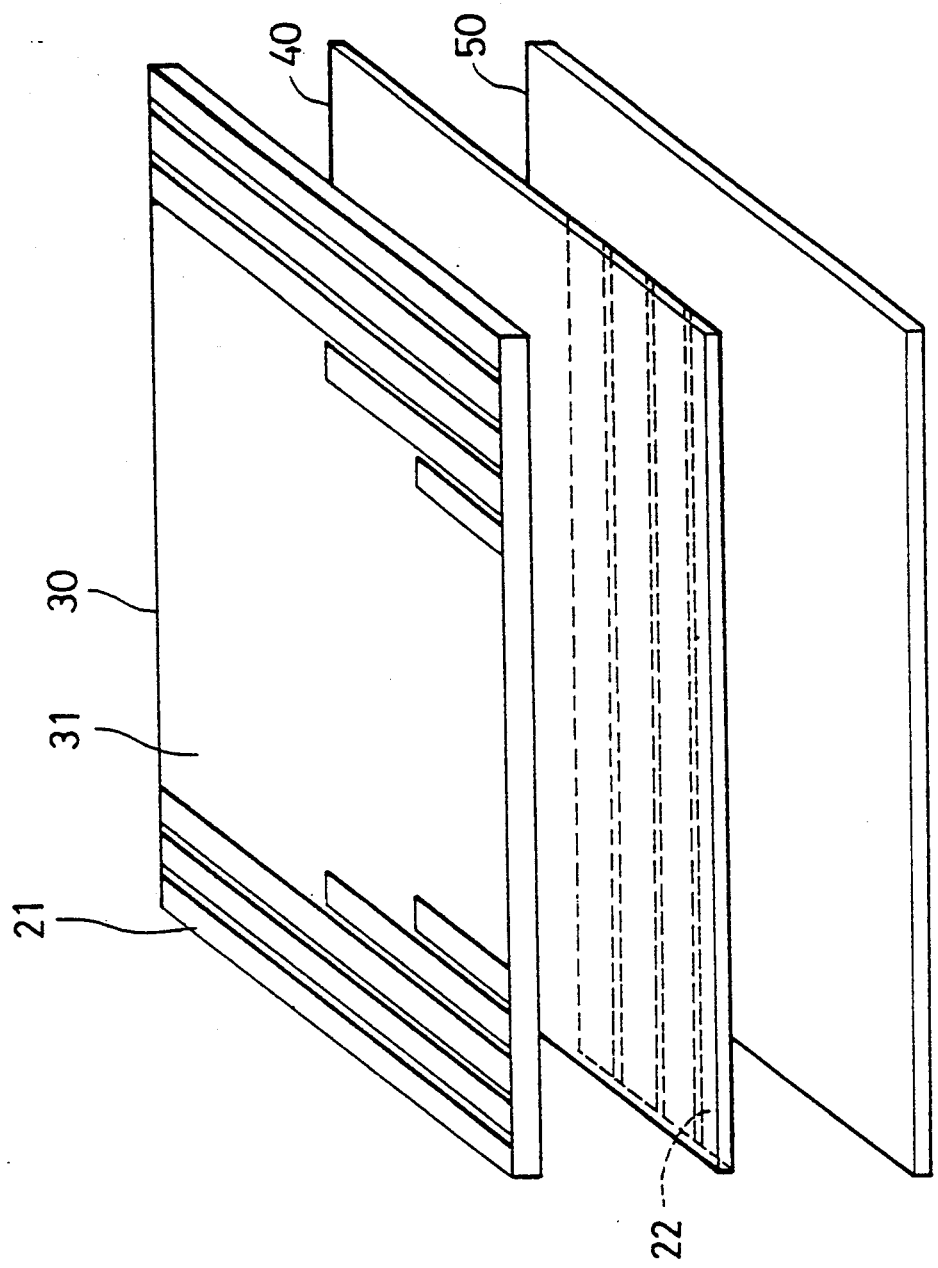
FIG. 3 is an exploded perspective view of a digitizer board according to the present invention.
Figure 4A:
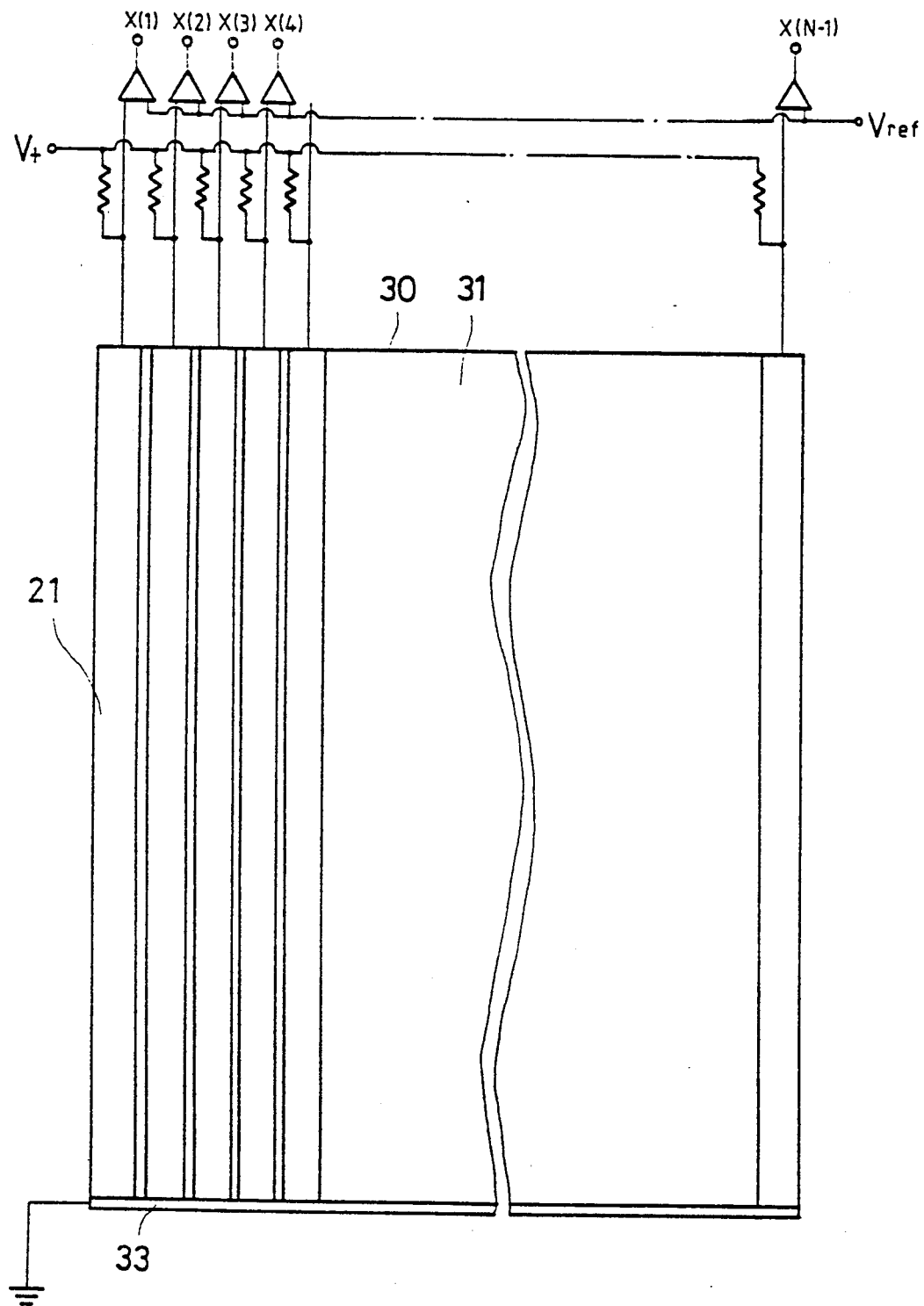
FIG. 4A shows the coupling of a plurality of analog comparators to the magneto-resistors arranged on a first substrate.
Figure 4B:
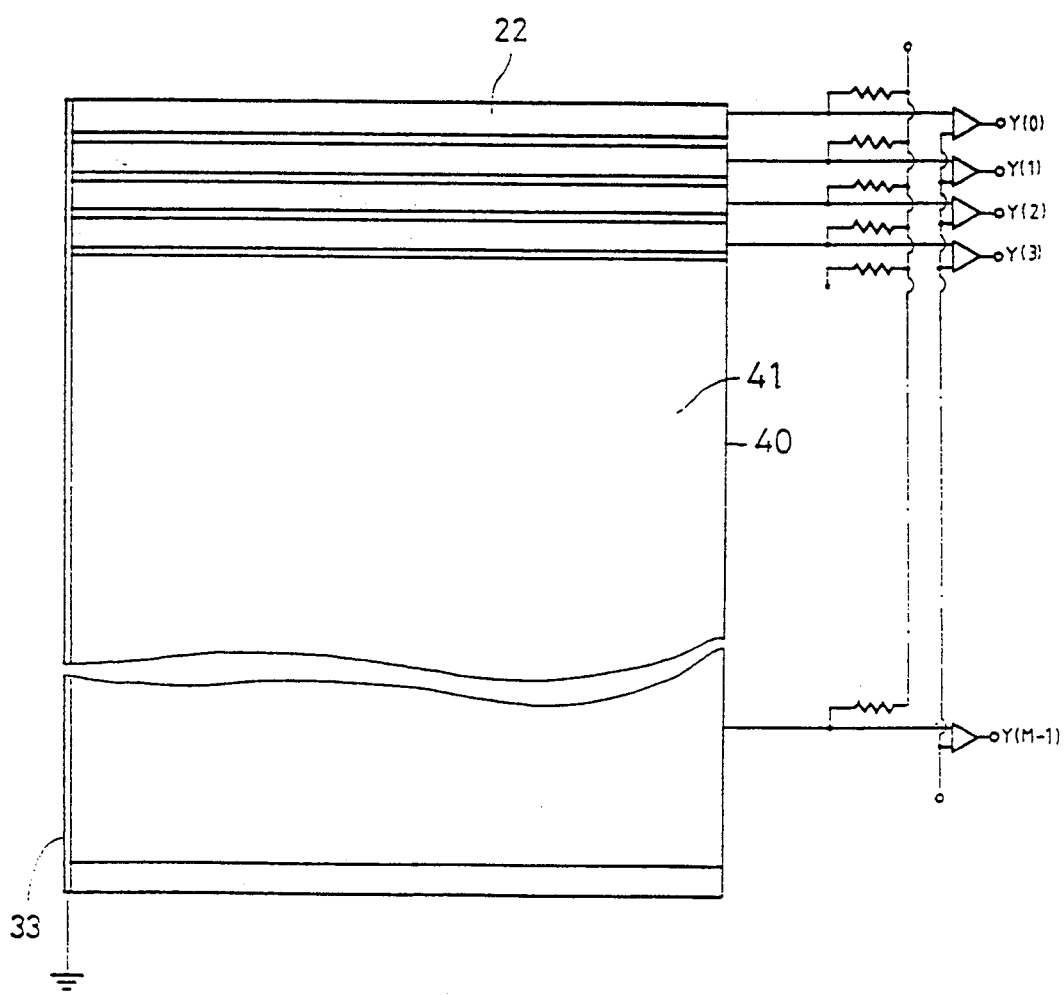
FIG. 4B shows the coupling of a plurality of analog comparators to the magneto-resistors arranged on a second substrate.

Referring to FIGS. 3 and 4A-4B, there is shown a preferred embodiment of a digitizer board 20 according to the present invention. The digitizer board 20 comprises a first substrate 30 and a second substrate 40 which are made of dielectric materials. Each of the first substrate 30 and the second substrate 40 is with a dimension of 8.5" by 11" which is the normal size of a printing paper.

The first substrate 30 is provided with an array of first magneto-resistors 21 on the front surface 31 thereof. And the second substrate 40 is provided with an array of second magneto-resistors 22 on the reverse surface 41 thereof. Each of the first magnetic resistors 21 and each of the second magneto-resistors 22 is made into a long strip. The first magnetic resistors 21 arranged on the front surface 31 of the first substrate 30 are all oriented in parallel in a X-direction as indicated by an arrow; and the second magneto-resistors 22 disposed on the reverse surface 32 of the second substrate 40 are also all oriented in parallel but in a Y-direction as indicated by another arrow. The X-direction and the Y-direction are normal to each other.

Referring to FIGS. 4A and 4B, one end of each of the first magnetic resistors 21 and each of the second magnetic resistors 22 is connected to a common ground 33; and the other end of the same is connected to an above-described analog comparator 10.

The digitizer board 20 is further comprised of a plate 50 made of materials with a high magnetic permeability. The plate 50 is attached, either by glue or by vacuum deposition technique, to the second substrate 40. An insulating layer 41 should be provided between the plate 50 and the second substrate 40 to insulate the plate 50 from the second magneto-resistors 22. As a magnetic field source (such as a pen 60 with a magnetic pinpoint 61 shown in FIG. 7) is put above the first substrate 30, the plate 50 is capable of attracting the magnetic field thereto, thereby converging the magnetic field which passes through the magneto-resistors 21, 22. This results in a larger flux density of the magnetic field acting on the magneto-resistors 21, 22.

Figure 5:
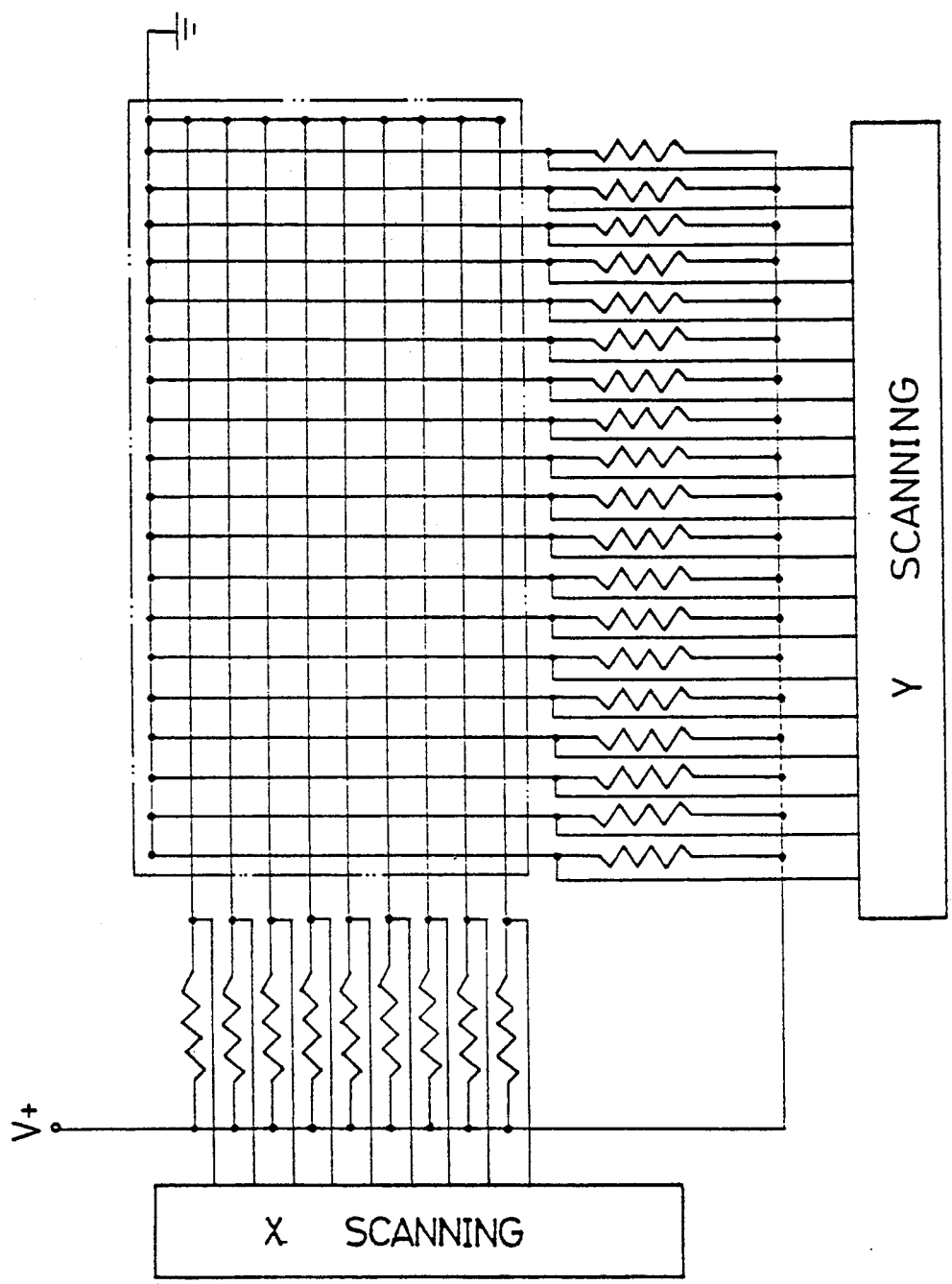
FIG. 5 shows a schematic diagram of the digitizer board according to the present invention.

As shown in FIG. 4A, there are arranged N first magneto-resistors 21 on the front surface 31 of the first substrate 30; and as shown in FIG. 4B, there are arranged M second magneto-resistors 22 on the reverse surface 41 of the second substrate 40; where N and M are integer numbers. FIG. 5 shows a schematic diagram of the digitizer board. The output digital signals from the N analog comparators coupled to the N first magneto-resistors 21 are designated $X(0), X(1), X(2) \ldots$ and $X(N-1)$; and the output digital signals from the M analog comparators coupled to the M second magneto-resistors 22 are designated $Y(0), Y(1), Y(2) \ldots$ and $Y(M-1)$.

The selection of the integers N and M is dependent on the resolution power required by a particular application. For example, for a digitizer board capable of inputting graphic data printed on a normal 8.5" by 11" paper with a resolution power of 250 DPI (dot per inch), $N=250*8.5=2125$ magneto-resistors should be arranged along the X-direction and $M=250*11=2750$ magnet-resistors should be arranged along the Y-direction. In such a case, each of the magneto-resistors 21, 22 is fabricated into a strip with a width of 80 $\mu$m, and the distance between two adjacent strips is 20 $\mu$m.

Figure 6A:
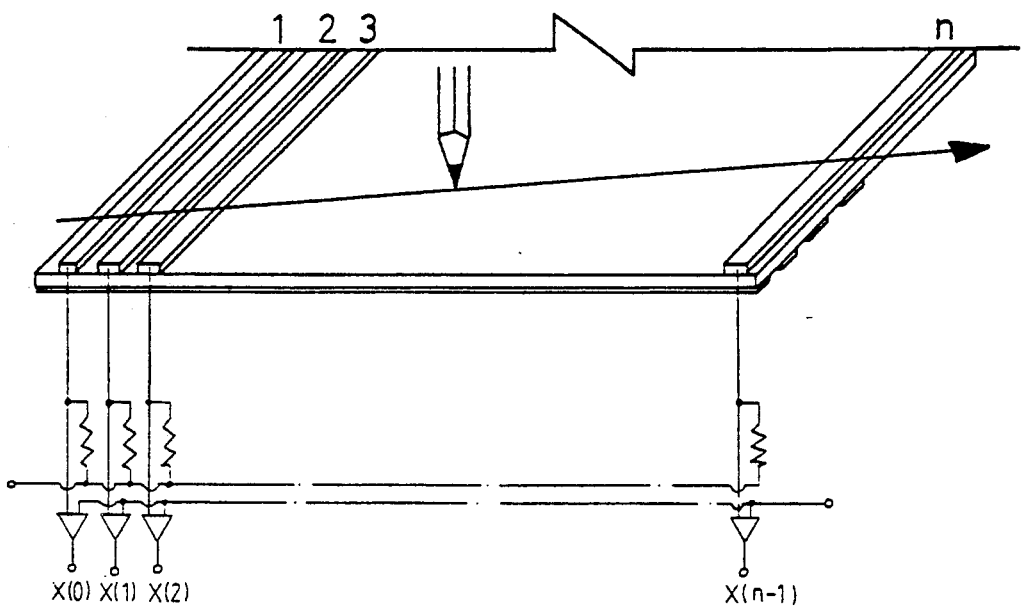
Figure 6B:
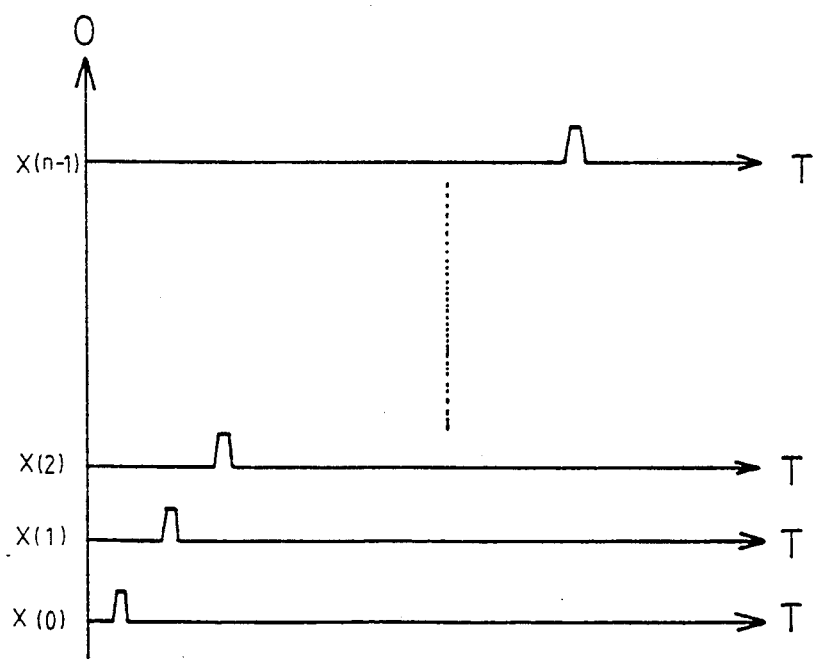

Referring to FIGS. 6A-6B, an experiment is conducted to show the operation of the digitizer board of the present invention. As shown in FIG. 6A, a pen 60 with a magnetic pinpoint sweeps over and across the surface of the first substrate 30. When the pen 60 is passing over the (k)th strip of the magneto-resistors, a pulse representing a digital signal of 1 appears at the (k)th scan line as shown in FIG. 6B.

Figure 7:
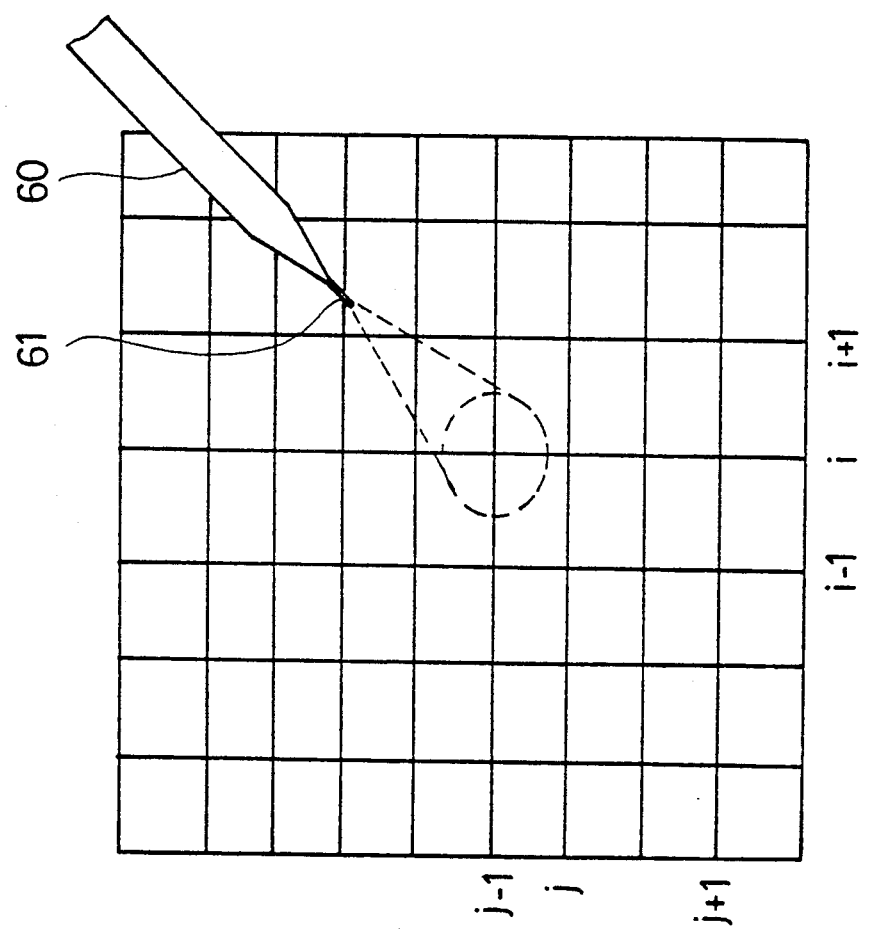
FIG. 7 is a schematic illustration, showing the operation of the digitizer board according to the present invention.

Referring to FIG. 7, the pen 60 is positioned somewhere on the digitizer board 20 such that the magnetic flux from the pinpoint 61 thereof flows through the substrates 30 and 40 (a dotted circle indicates the portion through where the magnetic flux passes and whose diameter is about 3 mm) to the plate 50. Since the density of the magneto-resistors 21, 22 arranged on the substrate 30 is quite dense (250 strips per inch) the magnetic flux would pass at least a crossing point of one of the first magneto-resistors 21 and one of the second magneto-resistors 22. Assume that the dotted circle encircles a crossing of a (i)th strip of the first magneto-resistors 21 and a (j)th strip of the second magneto-resistors 22, where $0 \leq i \leq N-1$ and $0 \leq k \leq M-1$. Accordingly, the analog comparator that is coupled to the (i)th strip of the first magneto-resistors 21 sends out a digital signal of $X(i)=1$ and the analog comparator that is coupled to the (j)th strip of the second magneto-resistors 22 sends out a digital signal of $Y(j)=1$. The digital signals are received by a computer system (not shown) coupled to the digitizer board. The computer will subsequently process programs that are stored in a memory location indicated by the digital signals.

The magneto-resistor used in the preferred embodiment of the present invention is made of a composition of InSb. Silicon or glass is utilized for making the substrates 30, 40 so that the substrates 30, 40 have smooth surfaces. To fabricate the magneto-resistors 21, 22 on the surface of the substrates, thin film deposition method is used.

The present invention has been described hitherto by way of exemplary preferred embodiments, however it is to be understood that the preferred embodiments are not intended to limit the scope of the present invention. Instead the present invention is intended to cover various modifications and variations to the above disclosed preferred embodiments. For example, the first magneto-resistors 21 and the second magneto-resistors 22 could be deposited on the front surface and the reverse surface of a same substrate. The magneto-resistors could be arranged in many other ways on the surface of a substrate. The spirit and scope of the present invention will be recited in the following appended claims.

What is claimed is:

1. A digitizer board coupled to a computer system, comprising:
   a substrate having a first surface and a second surface;
   an array of first magnetic resistors arranged on the first surface of said substrate, each of which is substantially strip-shaped and oriented in a first direction;
   an array of second magnetic resistors arranged on the second surface of said substrate, each of which is substantially strip-shaped and oriented in a second direction, the second direction being substantially normal to the first direction;
   a plurality of signal generating means, each of which is respectively coupled to one of the first magneto-resistors and the second magneto-resistors;
   wherein as a magnetic source is placed near said digitizer board, each of the magneto-resistors which are effected by the magnetic field from the magnetic source changes its resistance value and thereby causes the signal generating means which is coupled thereto to produce a signal.

2. A digitizer board according to claim 1, further comprising:
   a plate made of a material with a high magnetic permeability, said plate being attached to said substrate.

3. A digitizer board according to claim 1, wherein said first magneto-resistors and said second magneto-resistors are made of a composition of InSb.

4. A digitizer board according to claim 1, wherein said substrate is made of a dielectric material of silicon.

5. A digitizer board according to claim 1, wherein said magnetic source is a magnetic pen point which outputs a constant magnetic field.

6. A digitizer board according to claim 1, wherein said plurality of signal generating means includes first and second pluralities of comparators, each comparator in said first plurality of comparators being connected to a corresponding magnetic resistor in said array of first magnetic resistors and each comparator in said second plurality of comparators being connected to a corresponding magnetic resistor in said array of second magnetic resistors.

* * * * *